US011856221B2

(12) United States Patent
Lee et al.

(10) Patent No.: US 11,856,221 B2
(45) Date of Patent: *Dec. 26, 2023

(54) METHOD AND DEVICE FOR IMAGE ENCODING AND DECODING, AND RECORDING MEDIUM HAVING BIT STREAM STORED THEREIN

(71) Applicants: Electronics and Telecommunications Research Institute, Daejeon (KR); CHIPS & MEDIA, INC, Seoul (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR); Dae Yeon Kim, Seoul (KR); Dong Jin Park, Seoul (KR)

(73) Assignees: Electronics and Telecommunications Research Institute, Daejeon (KR); CHIPS & MEDIA, INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,630

(22) Filed: Aug. 1, 2022

(65) Prior Publication Data

US 2022/0368942 A1 Nov. 17, 2022

Related U.S. Application Data

(63) Continuation of application No. 16/958,612, filed as application No. PCT/KR2018/016842 on Dec. 28, 2018, now Pat. No. 11,445,215.

(30) Foreign Application Priority Data

Dec. 28, 2017 (KR) .................. 10-2017-0181766

(51) Int. Cl.
*H04N 19/55* (2014.01)
*H04N 19/182* (2014.01)
*H04N 19/563* (2014.01)

(52) U.S. Cl.
CPC .......... *H04N 19/55* (2014.11); *H04N 19/182* (2014.11); *H04N 19/563* (2014.11)

(58) Field of Classification Search
CPC .... H04N 19/55; H04N 19/182; H04N 19/563; H04N 19/597
See application file for complete search history.

(56) References Cited

U.S. PATENT DOCUMENTS

2013/0216150 A1* 8/2013 Kondo ................... H04N 19/59
382/238
2014/0218473 A1 8/2014 Hannuksela et al.
(Continued)

FOREIGN PATENT DOCUMENTS

CN 105432082 A 3/2016
CN 105580373 A 5/2016
(Continued)

*Primary Examiner* — Nasim N Nirjhar
(74) *Attorney, Agent, or Firm* — William Park & Associates Ltd.

(57) ABSTRACT

Disclosed is a method of decoding an image and a method of encoding an image. The method of decoding an image includes: obtaining motion-constrained tile set information; determining, on the basis of the motion-constrained tile set information, a first boundary region of a collocated tile set within a reference picture, which corresponds to a motion-constrained tile set; padding a second boundary region corresponding to the first boundary region; and performing inter prediction on the motion-constrained tile set by using a collocated tile set that includes the padded second boundary region.

3 Claims, 17 Drawing Sheets

(56) References Cited

U.S. PATENT DOCUMENTS

| | | | |
|---|---|---|---|
| 2014/0301464 A1* | 10/2014 | Wu | H04N 19/436 |
| | | | 375/240.15 |
| 2015/0245059 A1 | 8/2015 | Terada et al. | |
| 2016/0150236 A1* | 5/2016 | Maeda | H04N 19/44 |
| | | | 375/240.08 |
| 2018/0103199 A1* | 4/2018 | Hendry | H04N 21/8543 |
| 2019/0082193 A1* | 3/2019 | Sun | H04N 19/82 |
| 2019/0215532 A1* | 7/2019 | He | G06T 17/10 |
| 2020/0260071 A1* | 8/2020 | Hannuksela | H04N 19/51 |

FOREIGN PATENT DOCUMENTS

| | | |
|---|---|---|
| KR | 100772576 B1 | 11/2007 |
| KR | 1020150140360 A | 12/2015 |
| KR | 1020160019091 A | 2/2016 |
| KR | 1020160031515 A | 3/2016 |
| KR | 1020170115969 A | 10/2017 |
| WO | 0186962 A1 | 11/2001 |
| WO | 2014168650 A1 | 10/2014 |
| WO | 2015004879 A1 | 1/2015 |
| WO | 2015009676 A1 | 1/2015 |

\* cited by examiner

| Index | Projection format Description |
|---|---|
| 0 | Equirectangular (ERP) |
| 1 | Cubemap (CMP) |
| 2 | Equal-area (EAP) |
| 3 | Octahedron (OHP) |
| 4 | Viewport generation using rectilinear projection |
| 5 | Icosahedron (ISP) |
| 6 | Crasters Parabolic Projection for CPP-PSNR calculation |
| 7 | Truncated Square Pyramid (TSP) |
| 8 | Segmented Sphere Projection (SSP) |
| 9 | Adjusted Cubemap Projection (ACP) |
| 10 | Rotated Sphere Projection (RSP) |

FIG.9
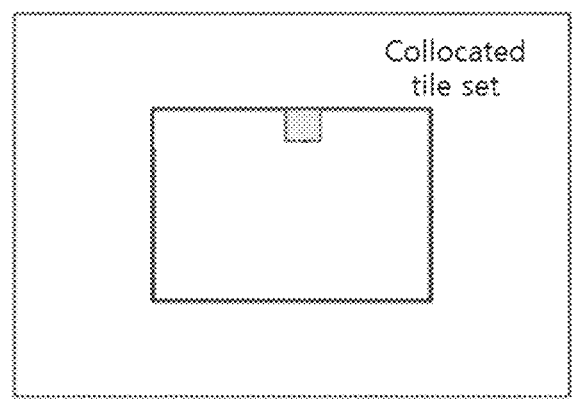
Reference picture
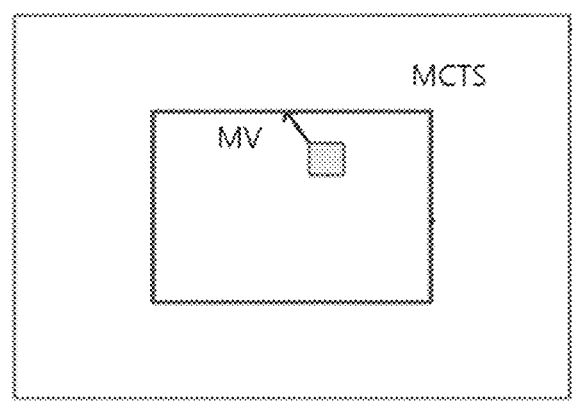
Current picture

FIG.16
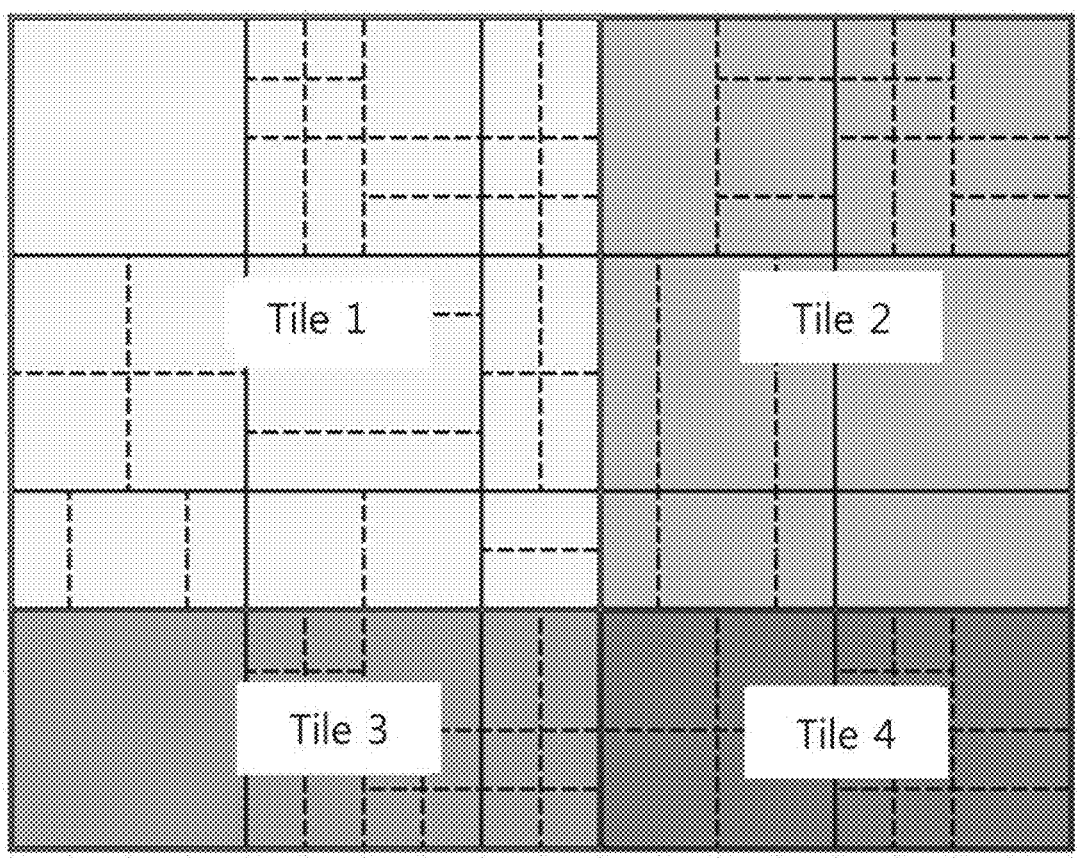
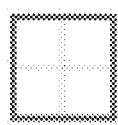 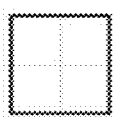 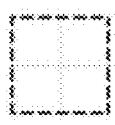
Tile　　CTU　　CU

FIG.17
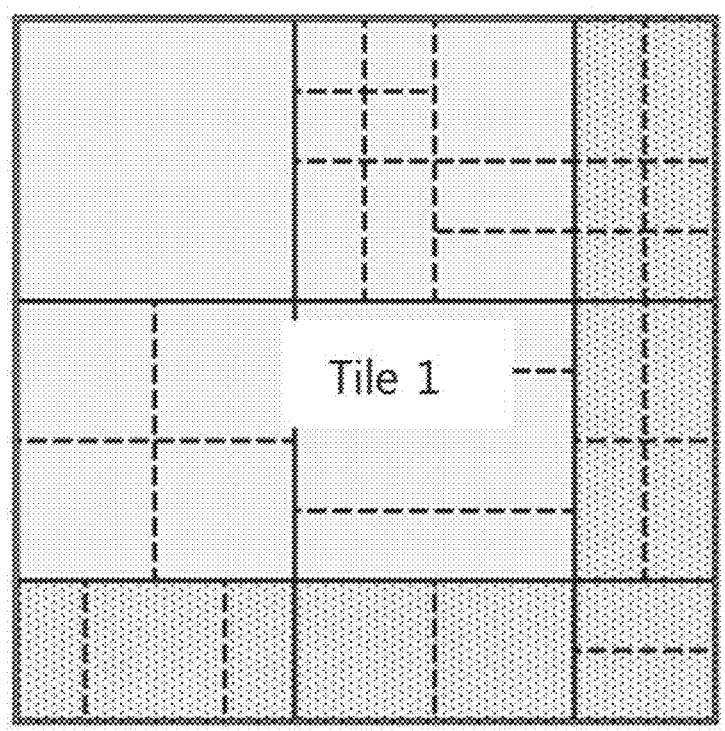
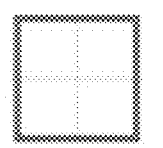
Tile
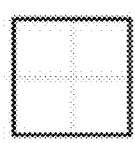
CTU
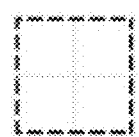
CU
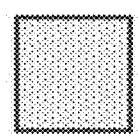
incomplete CTU FIG.18
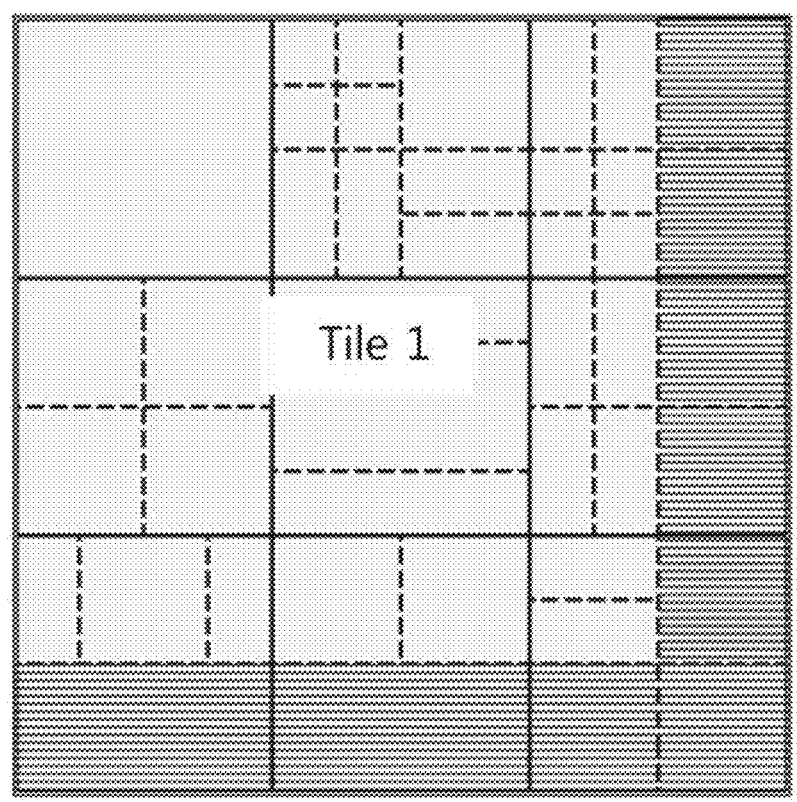
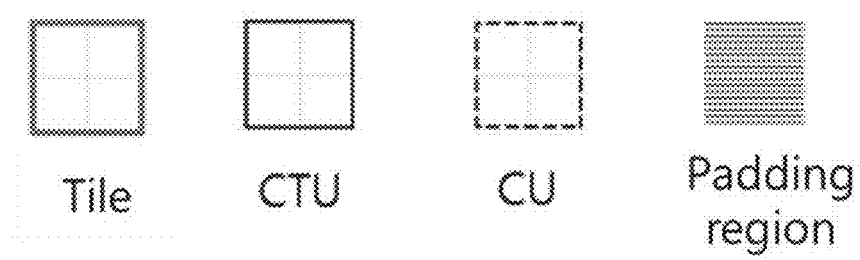

FIG.19
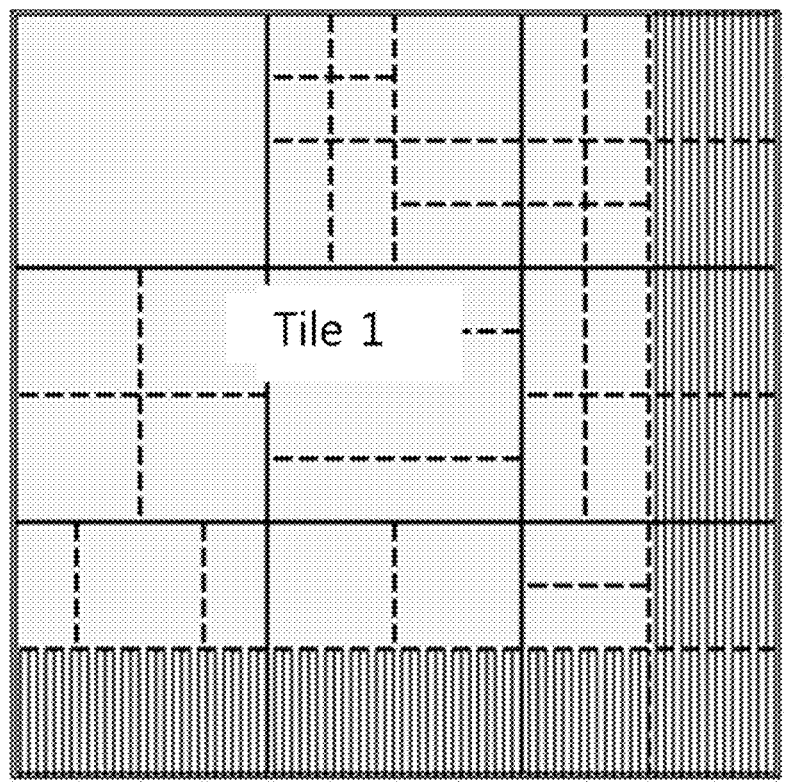
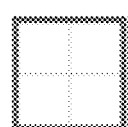 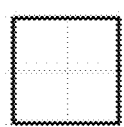  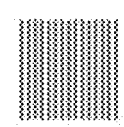
Tile     CTU     CU     Extended region

METHOD AND DEVICE FOR IMAGE ENCODING AND DECODING, AND RECORDING MEDIUM HAVING BIT STREAM STORED THEREIN

CROSS-REFERENCE TO RELATED APPLICATIONS

The present application is a continuation application of U.S. application Ser. No. 16/958,612, filed on Jun. 26, 2020, which was the National Stage of International Application No. PCT/KR2018/016842 filed on Dec. 28, 2018, which claims priority to Korean Patent Application KR10-2017-0181766, filed on Dec. 28, 2017, with the Korean Intellectual Property Office, which are incorporated herein by reference in their entirety.

TECHNICAL FIELD

The present invention relates to a method and apparatus for encoding/decoding an image, and a recording medium for storing a bitstream. More particularly, the present invention relates to a method and apparatus for encoding/decoding an image by using a motion-constrained tile set.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, a high-efficiency image encoding/decoding technique for an image with high-resolution and high image quality is required.

Image compression techniques include various techniques, such as an inter prediction technique of predicting a pixel value included in a current picture from the preceding or following picture of the current picture, an intra prediction technique of predicting a pixel value included in a current picture by using pixel information within the current picture, transform and quantization techniques for compressing the energy of a residual signal, an entropy encoding technique of assigning a short code to a value with a high appearance frequency and of assigning a long code to a value with a low appearance frequency, and the like. These image compression techniques are used to compress image data effectively for transmission or storage.

Particularly, in recent years, research on a virtual reality (VR) technique for simulating the real world and providing a realistic experience has been carried out widely.

A VR system, such as a head mounted display (HMD), is of interest in that it is capable of providing three-dimensional stereoscopic images to both eyes of the user and of tracking the view points in all directions, so that it is possible to provide realistic virtual reality (360 VR) image content viewable at 360 degrees.

However, the 360 VR content is composed of multi-view image information in all directions simultaneously wherein time and binocular images are compositely synchronized in a spatial manner, so that in production and transmission of the image, two large images synchronized with respect to binocular spaces at all viewpoints are encoded for compression and transmission. This aggravates the complexity and the burden of bandwidth. In particular, in a decoding apparatus, decoding is performed even on a region which is out of the user's viewpoint and is not actually viewed, so that an unnecessary process is performed.

Therefore, an efficient encoding/decoding method is required considering prevention of image quality deterioration, decrease in the amount of data for transmitting the image and the complexity, battery consumption of a decoding apparatus, and the like.

DISCLOSURE

Technical Problem

The present invention provides, in order to enhance image encoding/decoding efficiency, a method of encoding/decoding an image by using a motion-constrained tile set.

Technical Solution

A method of decoding an image according to the present invention, the method may comprise obtaining motion-constrained tile set information; determining, on the basis of the motion-constrained tile set information, a first boundary region of a collocated tile set within a reference picture, which corresponds to a motion-constrained tile set; padding a second boundary region corresponding to the first boundary region; and performing inter prediction on the motion-constrained tile set by using a collocated tile set that includes the padded second boundary region.

In the method of decoding an image according to the present invention, wherein the determining of the first boundary region comprises: identifying the motion-constrained tile set on the basis of the motion-constrained tile set information; and determining, as the first boundary region, a region formed by a pre-defined number of pixels inward from an outermost boundary of the collocated tile set within the reference picture, which corresponds to the identified motion-constrained tile set.

In the method of decoding an image according to the present invention, wherein the first boundary region is a region formed inward from an outermost boundary of the collocated tile set, which corresponds to the identified motion-constrained tile set, by the number of pixels that is determined on the basis of integer precision depending on a size of a filter tap used in the inter prediction.

In the method of decoding an image according to the present invention, wherein at the padding of the second boundary region, padding is performed inserting a preset sample value into the second boundary region.

In the method of decoding an image according to the present invention, wherein at the padding of the second boundary region, padding is performed inserting a value derived from a nearby region of the second boundary region into the second boundary region.

In the method of decoding an image according to the present invention, wherein the padding of the second boundary region comprises: interpolating the padded second boundary region.

In the method of decoding an image according to the present invention, wherein the second boundary region is a region formed outward from an outermost boundary of the collocated tile set, which corresponds to the identified motion-constrained tile set, by the number of pixels that is determined on the basis of integer precision depending on a size of a filter tap used in the inter prediction.

In the method of decoding an image according to the present invention, wherein the performing of the inter prediction on the motion-constrained tile set comprises: constructing a motion vector candidate list on the basis of the collocated tile set that includes the padded second boundary region; and performing the inter prediction on the motion-constrained tile set by using the motion vector candidate list.

In the method of decoding an image according to the present invention, wherein at the constructing of the motion vector candidate list, the motion vector candidate list is constructed excluding a motion vector that indicates a reference sample positioned outside the collocated tile set including the padded second boundary region.

A method of encoding an image according to the present invention, the method may comprise determining a motion-constrained tile set on the basis of viewport information; determining a first boundary region of a collocated tile set within a reference picture, which corresponds to the determined motion-constrained tile set; padding a second boundary region corresponding to the first boundary region; and performing inter prediction on the motion-constrained tile set by using a collocated tile set that includes the padded second boundary region.

In the method of encoding an image according to the present invention, wherein the first boundary region is a region formed by a pre-defined number of pixels inward from an outermost boundary of the collocated tile set within the reference picture, which corresponds to the determined motion-constrained tile set.

In the method of encoding an image according to the present invention, wherein the first boundary region is a region formed inward from an outermost boundary of the collocated tile set, which corresponds to the determined motion-constrained tile set, by the number of pixels that is determined on the basis of integer precision depending on a size of a filter tap used in the inter prediction.

In the method of encoding an image according to the present invention, wherein at the padding of the second boundary region, padding is performed inserting a preset sample value into the second boundary region.

In the method of encoding an image according to the present invention, wherein at the padding of the second boundary region, padding is performed inserting a value derived from a nearby region of the second boundary region into the second boundary region.

In the method of encoding an image according to the present invention, wherein the padding of the second boundary region comprises: interpolating the padded second boundary region.

In the method of encoding an image according to the present invention, wherein the second boundary region is a region formed outward from an outermost boundary of the collocated tile set, which corresponds to the determined motion-constrained tile set, by the number of pixels that is determined on the basis of integer precision depending on a size of a filter tap used in the inter prediction.

In the method of encoding an image according to the present invention, wherein the performing of the inter prediction on the motion-constrained tile set comprises: constructing a motion vector candidate list on the basis of the collocated tile set that includes the padded second boundary region; and performing the inter prediction on the motion-constrained tile set by using the motion vector candidate list.

In the method of encoding an image according to the present invention, wherein at the constructing of the motion vector candidate list, the motion vector candidate list is constructed excluding a motion vector that indicates a reference sample positioned outside the collocated tile set including the padded second boundary region.

A computer-readable non-transitory recording medium according to the present invention, the recording medium storing a bitstream formed by a method of encoding an image, the method comprising: determining a motion-constrained tile set on the basis of viewport information; determining a first boundary region of a collocated tile set within a reference picture, which corresponds to the determined motion-constrained tile set; padding a second boundary region corresponding to the first boundary region; and performing inter prediction on the motion-constrained tile set by using a collocated tile set that includes the padded second boundary region.

Advantageous Effects

The present invention provides, in order to enhance image encoding/decoding efficiency, a method of encoding/decoding an image by using a motion-constrained tile set.

According to the present invention, a boundary region of a collocated tile set is referenced, which is not referenced in a motion-constrained tile set, thereby improving image quality deterioration and enhancing a compression ratio.

According to the present invention, encoding and decoding efficiency of the image is enhanced.

According to the present invention, computation complexity of the image encoder and decoder is reduced.

DESCRIPTION OF DRAWINGS

FIG. 9 is a diagram illustrating that a reference region of a motion-constrained tile set is limited.

FIG. 16 is a diagram illustrating a tile in flexible size according to an embodiment of the present invention.

FIG. 17 is a diagram illustrating an incomplete CTU included within a tile 1 in FIG. 16.

FIG. 18 is a diagram illustrating padding processing on an incomplete CTU according to an embodiment of the present invention.

FIG. 19 is a diagram illustrating a process of generating a complete CTU by using a sample of a tile spatially adjacent to an incomplete CTU according to an embodiment of the present invention.

MODE FOR INVENTION

Figure 1:
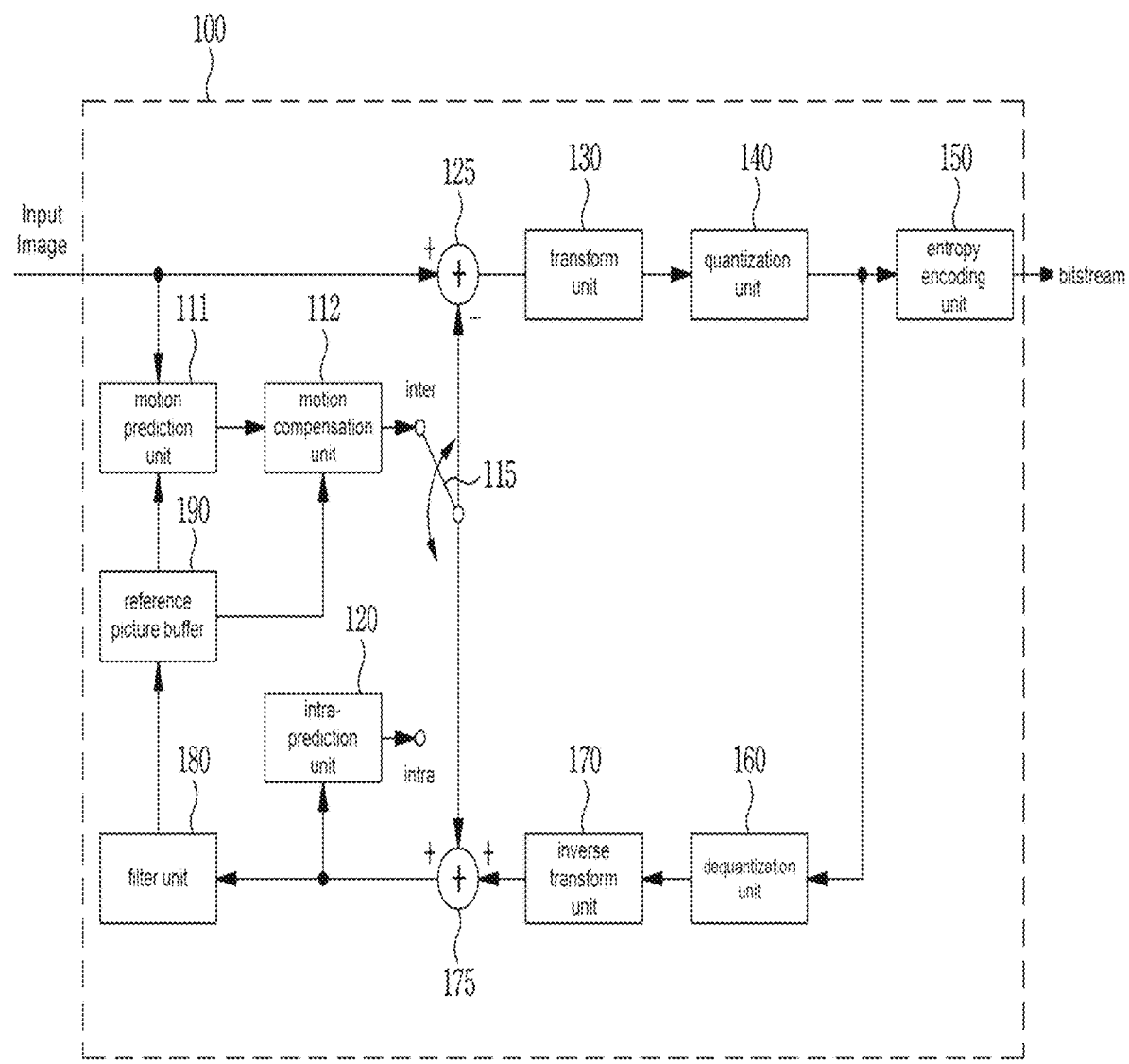
FIG. 1 is a block diagram illustrating a configuration according to an embodiment of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of a coding block falls within a first predetermined range, only quad-tree partitioning is allowed for the coding block. Here, the first predetermined range may be defined by at least one of a maximum size and a minimum size of a coding block that can be partitioned only by quad-tree partitioning. Information indicating the maximum/minimum size of the coding block for which quad-tree partitioning is allowed may be signaled as data included in a bitstream, and the information may be signaled in units of at least one of a sequence, a picture parameter, a tile group, and a slice (segment). Alternatively, the maximum/minimum size of the coding block may be a fixed size preset in the encoder/decoder. For example, when the size of the coding block is within a range from 64×64 to 256×256, the coding block can be partitioned only by quad-tree partitioning. Alternatively, when the size of the coding block is larger than the maximum size of a transform block (TB), the coding block can be partitioned only by quad-tree partitioning. In this case, the block to be partitioned into quadrants may be either a coding block or a transform block. In this case, information (for example, split_flag) indicating the quad-tree partitioning of a coding block may be a flag indicating whether or not the coding unit is partitioned by quad-tree partitioning. When the size of a coding block falls within a second predetermined range, the coding block can be partitioned only by binary-tree partitioning or ternary-tree partitioning. In this case, the above description of quad-tree partitioning can also be applied to binary-tree partitioning or ternary-tree partitioning.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an inter-polation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
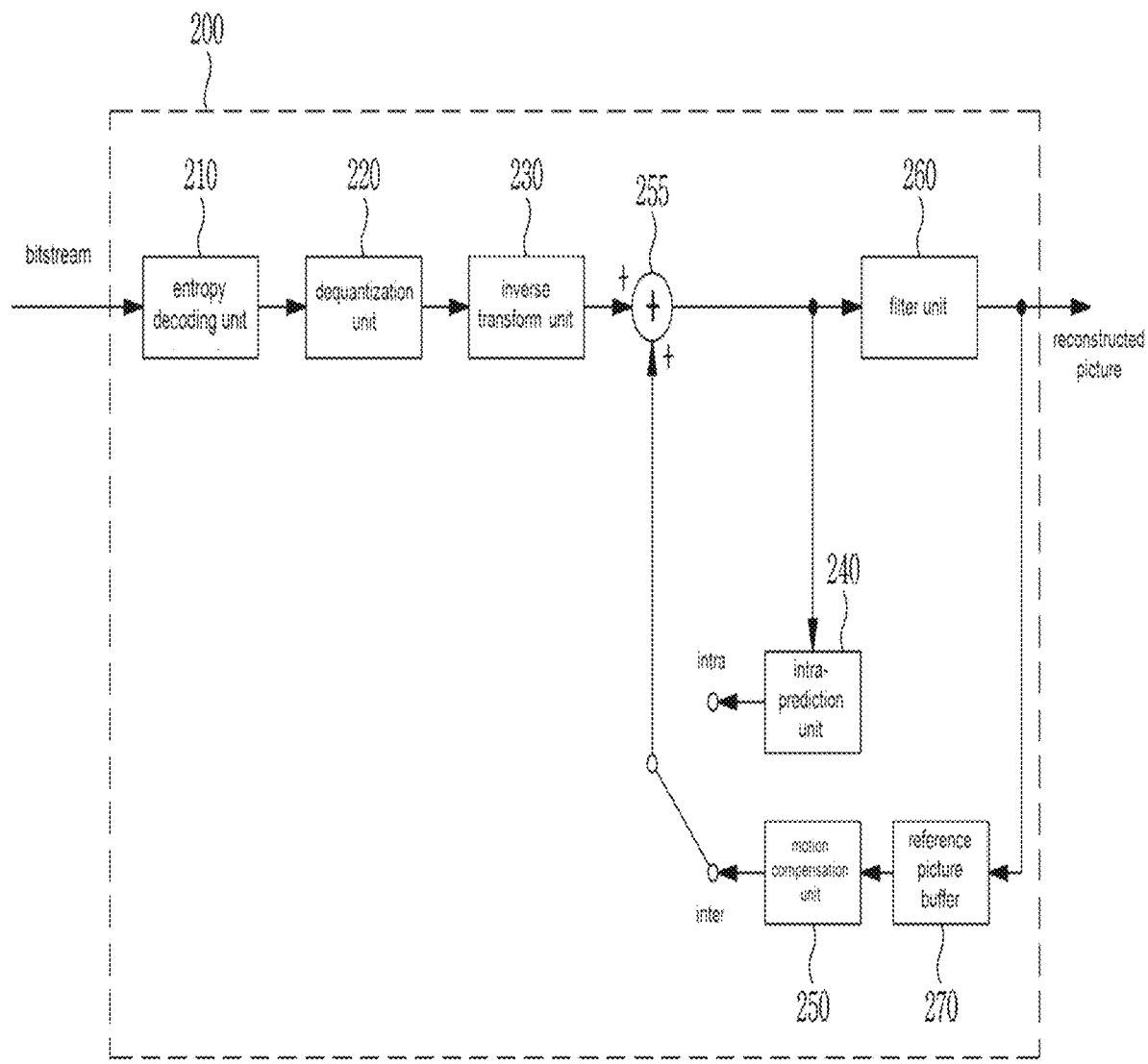
FIG. 2 is a block diagram illustrating a configuration according to an embodiment of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
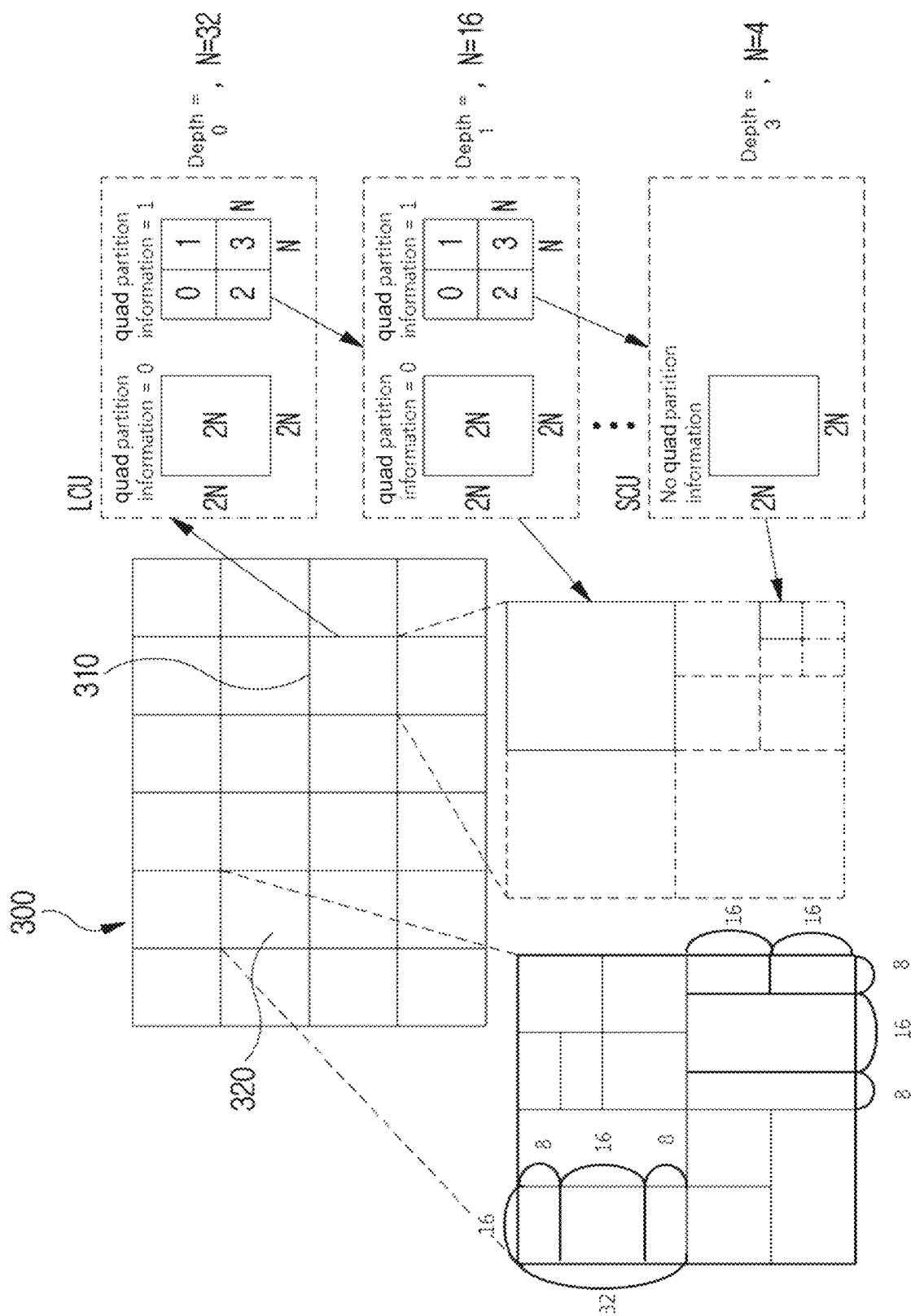
FIG. 3 is a diagram schematically illustrating a division structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
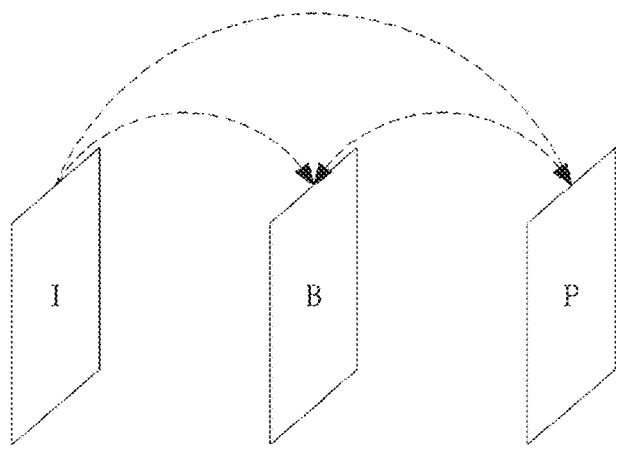
FIG. 4 is a diagram illustrating an example of an inter prediction process.

FIG. 4 is a diagram illustrating an embodiment of an inter-picture prediction process.

In FIG. 4, a rectangle may represent a picture. In FIG. 4, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 5:
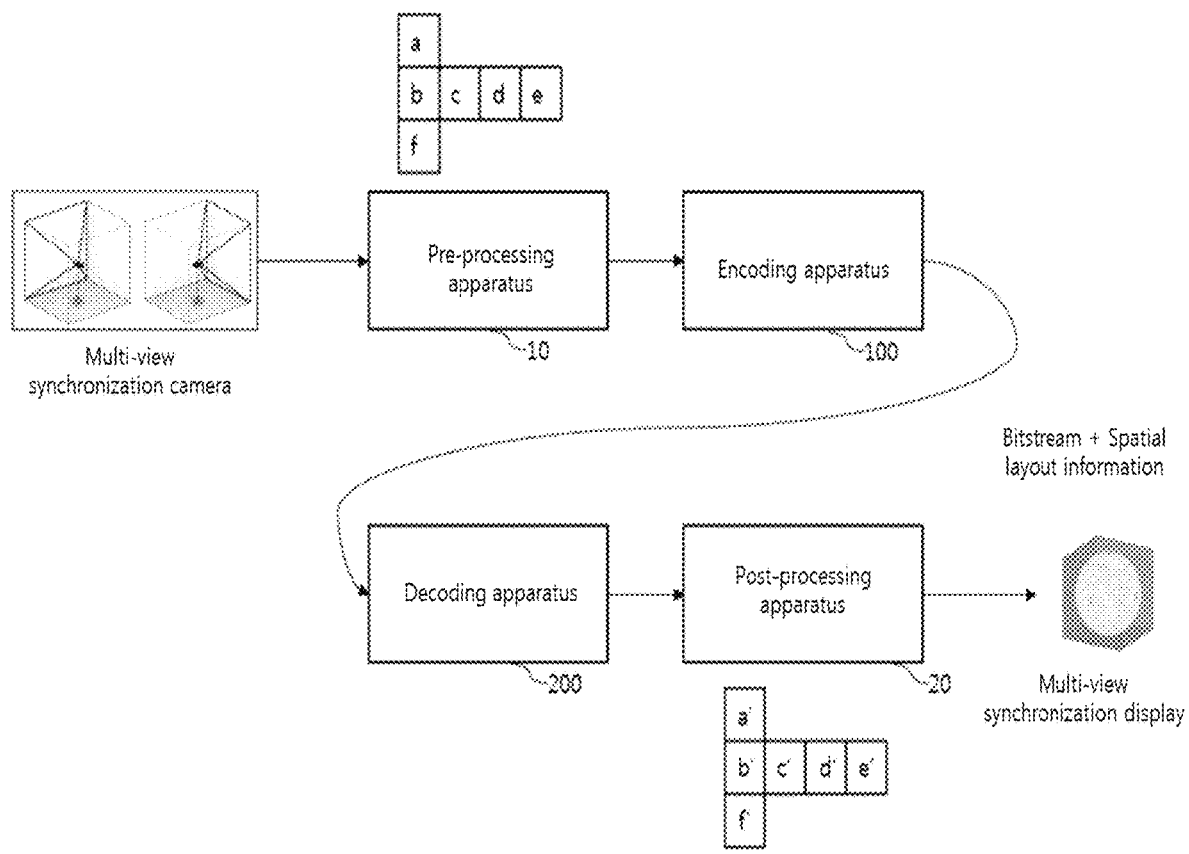
FIG. 5 is a diagram illustrating an example of an image system that includes an encoding apparatus and a decoding apparatus to which the present invention is applied.

FIG. 5 is a diagram illustrating an example of an image system that includes the encoding apparatus 100 and the decoding apparatus 200 to which the present invention is applied.

Referring to FIG. 5, the image system according to the embodiment of the present invention may include a pre-processing apparatus 10, the encoding apparatus 100, the decoding apparatus 200, and a post-processing apparatus 20.

The image system according to the embodiment of the present invention may process virtual reality image information according to the embodiment of the present invention.

The virtual reality image is an image that makes a user to have an experience as if the user is actually located there, is an image for representation in all directions by being synchronized with the user's view, and is also called a 360 video or a virtual reality video.

The image system may be configured to include: the pre-processing apparatus 10 obtaining a synchronized video frame by performing pre-processing, such as merging or stitching operation, on images of multiple viewpoints; the encoding apparatus 100 outputting a bitstream by encoding the synchronized video frame; the decoding apparatus 200 decoding the synchronized video frame after receiving the bitstream; and the post-processing apparatus 20 outputting the synchronized image for each viewpoint to each display through post-processing of the video frame.

Here, an input image may include an individual image for each viewpoint and, for example, may include sub image information at different viewpoints that is obtained when one or more cameras are temporally and spatially synchronized. Accordingly, the pre-processing apparatus 10 performs spatial merging or stitching processing on the obtained sub image information at different viewpoints according to a time, thereby obtaining synchronized virtual reality image information.

Further, the encoding apparatus 100 generates the bitstream by scanning and prediction encoding the synchronized virtual reality image information, and the generated bitstream may be transmitted to the decoding apparatus 200. Particularly, the encoding apparatus 100 according to the embodiment of the present invention may extract spatial layout information from the synchronized image information and may signal the same to the decoding apparatus 200.

Here, one or more sub images are merged by the pre-processing apparatus 10 into one video frame, so that the spatial layout information may include basic information on an attribute of each of the sub images in one video frame and the arrangement.

Further, the spatial layout information may also include additional information on sub images and on a relation between the sub images, and this will be described later.

Accordingly, the spatial layout information according to the embodiment of the present invention may be provided to the decoding apparatus 200. Further, the decoding apparatus 200 may determine the decoding target and the decoding order of the virtual reality image bitstream by referring to the spatial layout information and user viewpoint information, which results in efficient decoding.

Further, the decoded video frame is divided into sub images for respective displays by the post-processing apparatus 20 and the results are provided to multiple synchronized display systems, such as Head Mount Devices (HMDs). Accordingly, the user receives a virtual reality image with artificial reality.

To this end, after obtaining the virtual reality image, the encoding apparatus 100 according to the embodiment of the present invention may generate the spatial layout information, may signal the spatial layout information, and may encode and transmit the image.

For example, the encoding apparatus 100 divides the virtual reality image into video frames in units of time and extracts the spatial layout information on the video frames. The spatial layout information may be determined according to an attribute of each of the sub images and the arrangement state or may be determined according to information obtained from the pre-processing apparatus 10.

Further, the encoding apparatus 100 performs information processing for signaling the spatial layout information to the decoding apparatus 200. For example, the encoding apparatus 100 may perform at least one process for inclusion in the encoded image data, construction of a separate data formation, or for inclusion in meta data of the encoded image.

Further, the encoding apparatus 100 may encode the virtual reality image according to the time flow. Furthermore, the encoding apparatus 100 may determine the image scanning order, the reference image, and the like using the generated spatial layout information as reference information.

Accordingly, the encoding apparatus 100 may be improved in a more efficient manner with respect to the virtual reality image or the ultra high resolution image depending on the spatial layout information and the additional signaling information. This will be described later.

Further, the encoding apparatus 100 may perform one or more transform and transmission processes to combine the encoded image data and the spatial layout information for transmission to the decoding apparatus 200.

Figures 6, 7:
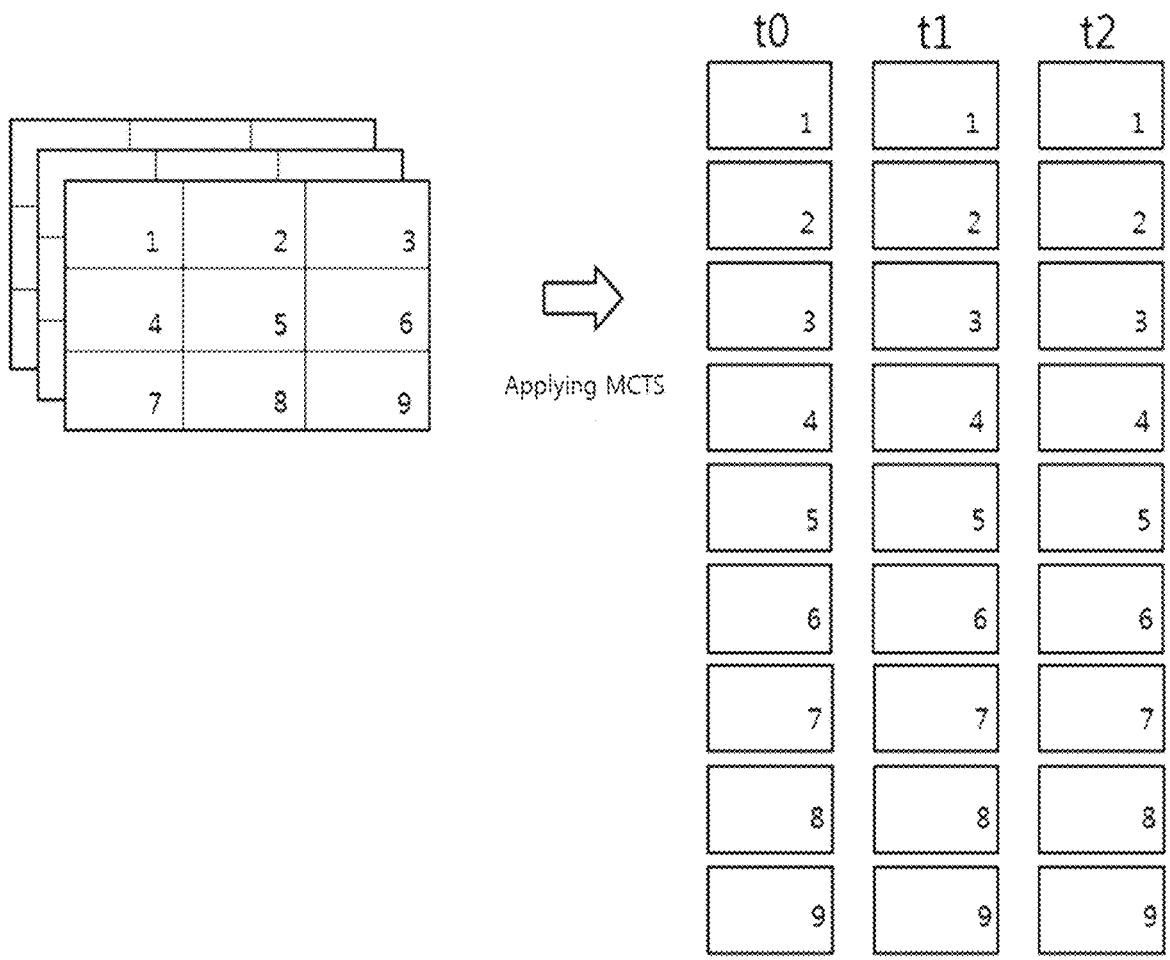
FIG. 6 is a diagram illustrating a format of spatial layout information and a method of signaling the same according to an embodiment of the present invention.
FIGS. 7 and 8 are diagrams illustrating a motion-constrained tile set according to an embodiment of the present invention.

FIG. 6 is a diagram illustrating formats of spatial layout information and methods of signaling the same according to various embodiments of the present invention.

As described above, the sub images of the input image may be arranged in various methods. Accordingly, the spatial layout information may separately include a table index for signaling arrangement information. For example, as shown in FIG. 6, according to the transform method, the virtual reality image has layouts such as Equirectangular (ERP), Cubemap (CMP), Equal-area (EAP), Octahedron (OHP), Viewport generation using rectilinear projection, Icosahedron (ISP), Crasters Parabolic Projection for CPP-PSNR calculation, Truncated Square Pyramid (TSP), Segmented Sphere Projection (SSP), Adjusted Cubemap Projection (ACP), Rotated Sphere Projection (RSP), and the like.

Here, the spatial layout information may include a table index shown in FIG. 6 corresponding to each of the layouts.

More specifically, according to the spatial layout information, a three-dimensional image of a coordinate system corresponding to an angle of 360 degrees may be projected into a two-dimensional image.

ERP is projection transform of a 360-degree image onto one face, and examples thereof may include transform processing of u and v coordinate system positions corresponding to the sampling position of the two-dimensional image, and transform processing of longitude and latitude coordinates on a sphere corresponding to the u and v coordinate system positions. Accordingly, the spatial layout information may include an ERP index and single-face information (for example, a face index is set to 0).

CMP is projection of the 360-degree image onto six faces in the shape of regular hexagon, wherein the sub images projected on respective face indexes (f) corresponding to PX, PY, PZ, NX, NY, and NZ (P denotes positive, and N denotes negative) are arranged. For example, CMP images may include an image obtained by transforming the ERP image into a 3×2 cube map image. Accordingly, the spatial layout information may include a CMP index and face index information corresponding to the sub image. The post-processing apparatus 20 processes two-dimensional position information on the sub image according to the face index to calculate position information corresponding to a three-dimensional coordinate system, and outputs the resulting three-dimensional 360-degree image in an inversely transformed manner.

Like CMP, ACP is projection of the 360-degree image onto six faces in the shape of regular hexagon, and applies a function adjusted to three-dimensional bending deformation corresponding to projection transform in two dimensions and inverse transform in three dimensions. The processing functions are different, but the used spatial layout information may include an ACP index and face index information for each sub image. Accordingly, according to the face index, the post-processing apparatus 20 performs inverse transform processing on the two-dimensional position information on the sub image according to the adjusted function, calculates the position information corresponding to the three-dimensional coordinate system, and outputs the resulting three-dimensional 360-degree image.

EAP is transform, which is the same as ERP, where projection takes place onto one face, and may include transform processing of longitude and latitude coordinates on a sphere immediately corresponding to the sampling position of the two-dimensional image. The spatial layout information may include the EAP index and the single-face information.

OHP is projection of the 360-degree image onto eight faces in the shape of regular octagon using six vertices. The sub images projected using the faces {F0, F1, F2, F3, F4, F5, F6, and F7} the vertices (V0, V1, V2, V3, V3, V4, and V5) may b arranged on a transform image. Accordingly, the spatial layout information may include an OHP index, face index information corresponding to each sub image, and one or more pieces of vertex index information matched with the face index information. Further, the sub image arrangement of the transform image may be divided into a compact case and a non-compact case. Accordingly, the spatial layout information may further include compactness identification information. For example, the face index, vertex index matching information, and the inverse transform process may be determined differently between the non-compact case and the compact case. For example, regarding a face index 4, in the non-compact case, matching with vertex indexes V0, V5, and V1 is processed, and in the compact case, another matching with vertex indexes V1, V0, and V5 is processed.

The post-processing apparatus 20 performs inverse transform on the two-dimensional position information on the sub image according to the face index and the vertex index to calculate vector information corresponding to the three-dimensional coordinate system, and outputs the resulting three-dimensional 360-degree image in an inversely transformed manner.

ISP is projection of a 360-degree image using 20 faces and 12 vertices. The sub images according to each transform may be arranged in the transform image. Similarly to OHP, the spatial layout information may include at least one among an ISP index, a face index, a vertex index, and compactness identification information.

SSP is processing where a sphere of a 360-degree image is divided into three segments: the Arctic, the equator, and the Antarctic. The Arctic and the Antarctic are mapped to two circles identified by an index, respectively. The edge between two pole segments is processed as an inactive sample in gray. Regarding the equator, the same projection method as ERP may be used. Accordingly, the spatial layout information may include an SSP index, and face indexes corresponding to equator, Arctic, and Antarctic segments.

RSP may include a method of dividing a sphere of a 360-degree image into two sections in the same size and of arranging images that result from division in two rows in a two-dimensional transform image. Further, RSP may implement the arrangement using six faces with an aspect ratio of 3×2 similar to CMP. Therefore, a transform image may include a first section image of the upper segment and a second section image of the lower segment. The spatial layout information may include at least one among a RSP index, a section image index, and a face index.

TSP may include a method of projecting a frame in a deformed manner in which a 360-degree image is projected onto six cube faces, correspondingly to faces of a truncated square pyramid. Accordingly, the sizes and the shapes of the sub images corresponding to respective faces may vary. The spatial layout information may include at least one among a TSP identification information and a face index.

Viewport generation using rectilinear projection is intended to transform a 360-degree image into a two-dimensional image projected with a Z axis as a viewing angle. The spatial layout information may include index information on viewport generation using rectilinear projection, and may further include information indicating the view point.

In the meantime, the spatial layout information may further include interpolation filter information to be applied in the image transform. For example, the interpolation filter information may vary according to each projection transform method, and may include at least one among a nearest neighboring filter, a bilinear filter, a bicubic filter, and a Lanczos filter.

In the meantime, the transform method and an index thereof for performance evaluation of pre-processing transform and post-processing inverse transform processing may be defined. For example, the performance evaluation may be used to determine the pre-processing method by the pre-processing apparatus 10, and examples of the method include a Crasters Parablic Projection (CPP) method in which two different transform images are converted into a CPP domain and Peak Signal-to-ratio (PSNR) is measured.

However, the table shown in FIG. 6 is an arbitrary arrangement according to the input image, and may be changed according to encoding efficiency, market content distribution, and the like.

Accordingly, the decoding apparatus 200 parses the table index signaled separately for use in decoding processing.

Particularly, in the embodiment of the present invention, each piece of layout information may be usefully used in partial decoding of the image. That is, sub image arrangement information, such as CUBIC LAYOUT, may be used to distinguish an independent sub image and a dependent sub image, and thus, it may be used to determine an efficient encoding and decoding scanning order or to perform partial decoding with respect to a particular point in time.

Hereinafter, an encoding method and a decoding method based on motion constraint according to an embodiment of the present invention will be described.

In order to process a large-size image of ultra high resolution, such as a virtual reality image, a picture may be divided into multiple tiles, and encoding is performed. Accordingly, an individual decoding process may be performed between the tiles that result from the division.

When the time is used in encoding/decoding, a tile set may be specified with respect to an array of one or more tiles. Further, a series of pictures may each have a tile set of the same configuration. Therefore, the tile set configuration of the current picture may be the same as the tile set configuration of the reference picture of the current picture.

For example, as shown in FIG. 7, a series of pictures (t0, t1, and t2) may each have a tile set of the same configuration.

In the meantime, for efficient encoding/decoding and transmission of a virtual reality image, the encoding method and the decoding method based on motion constraint may be used.

Specifically, in the encoding method and the decoding method based on motion constraint, a motion-constrained tile set (MCTS) may be used.

The motion-constrained tile set may refer to a tile set where inter prediction dependency is limited to a region within a tile set of each picture. That is, in inter prediction, motion information may be defined in a region within the motion-constrained tile set.

Figure 8:
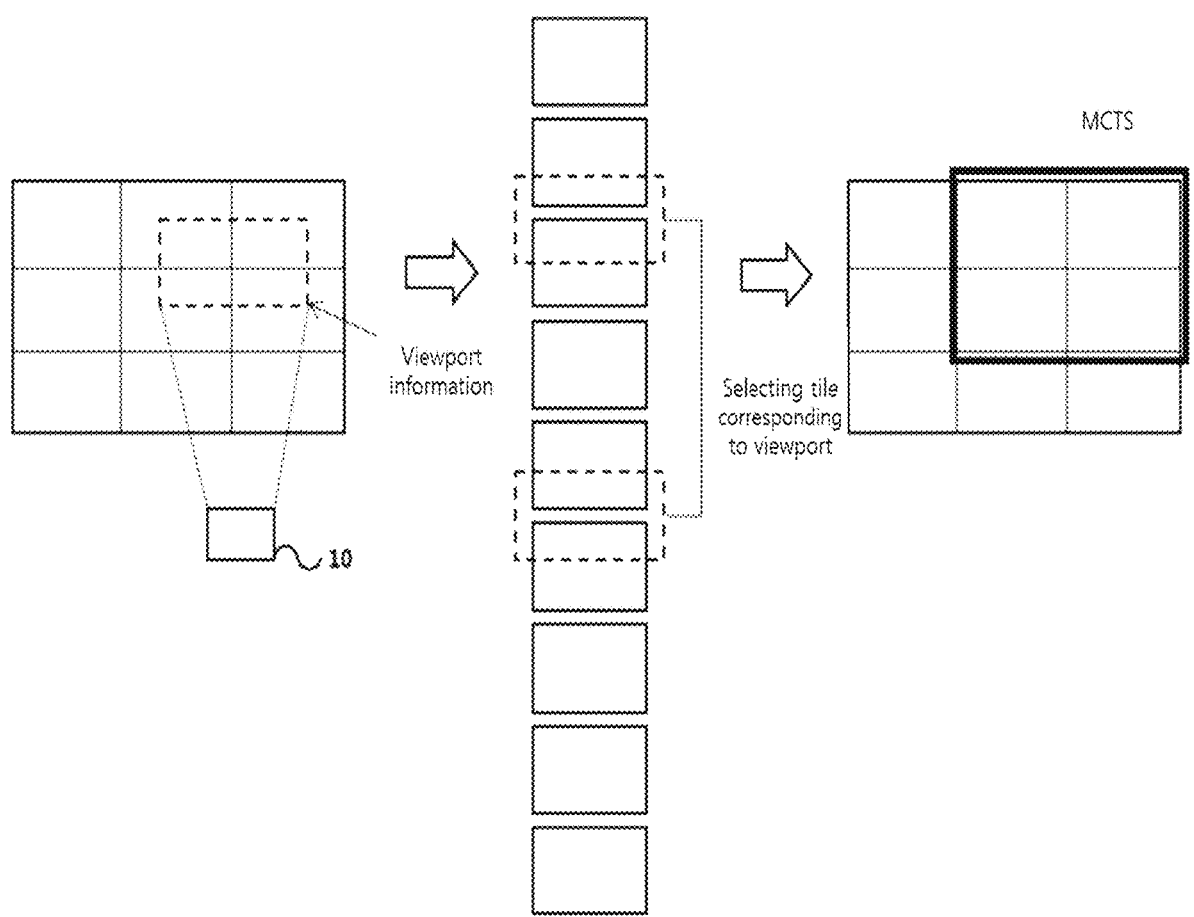

For example, as described in FIG. 8, according to viewport information generated by the pre-processing apparatus 10, a region specifying the motion-constrained tile set may be determined. Here, the pre-processing apparatus 10, such as a head mount device (HMD), may generate the viewport information or head tracking information by detecting the user's eye.

Accordingly, the encoding apparatus 100 and the decoding apparatus 200 may perform individual inter prediction on the motion-constrained tile set determined according to the viewport information. Further, the encoding apparatus 100 and the decoding apparatus 200 encodes/decodes the motion-constrained tile set corresponding to particular viewport information with high image quality, but encodes/decodes the other tiles with low image quality, thereby enhancing encoding/decoding efficiency.

FIG. 9 is a diagram illustrating that a reference region of a motion-constrained tile set is limited.

Referring to FIG. 9, the motion-constrained tile set (MCTS) may be constrained not to reference any region that is present outside a collocated tile set (or same-location tile set) within a reference picture. Therefore, in motion estimation of the motion-constrained tile set, the motion vector (MV) may be limited by the boundary of the collocated tile set of the motion-constrained tile set.

As described above, by limiting the reference region of the motion-constrained tile set, the motion-constrained tile set may perform motion compensation independently from other tile sets or regions outside.

In the meantime, during inter prediction of the motion-constrained tile set, in the process of performing reference only within the boundary of the collocated tile set of the reference picture, there is a problem that a region which is not referenced in the boundary region of the collocated tile set of the reference picture due to the reference block size and precision.

That is, in the collocated tile set of the motion-constrained tile set, accurate sample values are not used due to constraint on the reference region, resulting in image quality deterioration and degradation of a compression ratio. This may lead to larger image quality deterioration and degradation of a compression ratio in an environment, such as a virtual reality image, where the motion-constrained tile set is used more.

Accordingly, to solve the above-described problem, an inter prediction method of the motion-constrained tile set will be described below.

Figure 10:
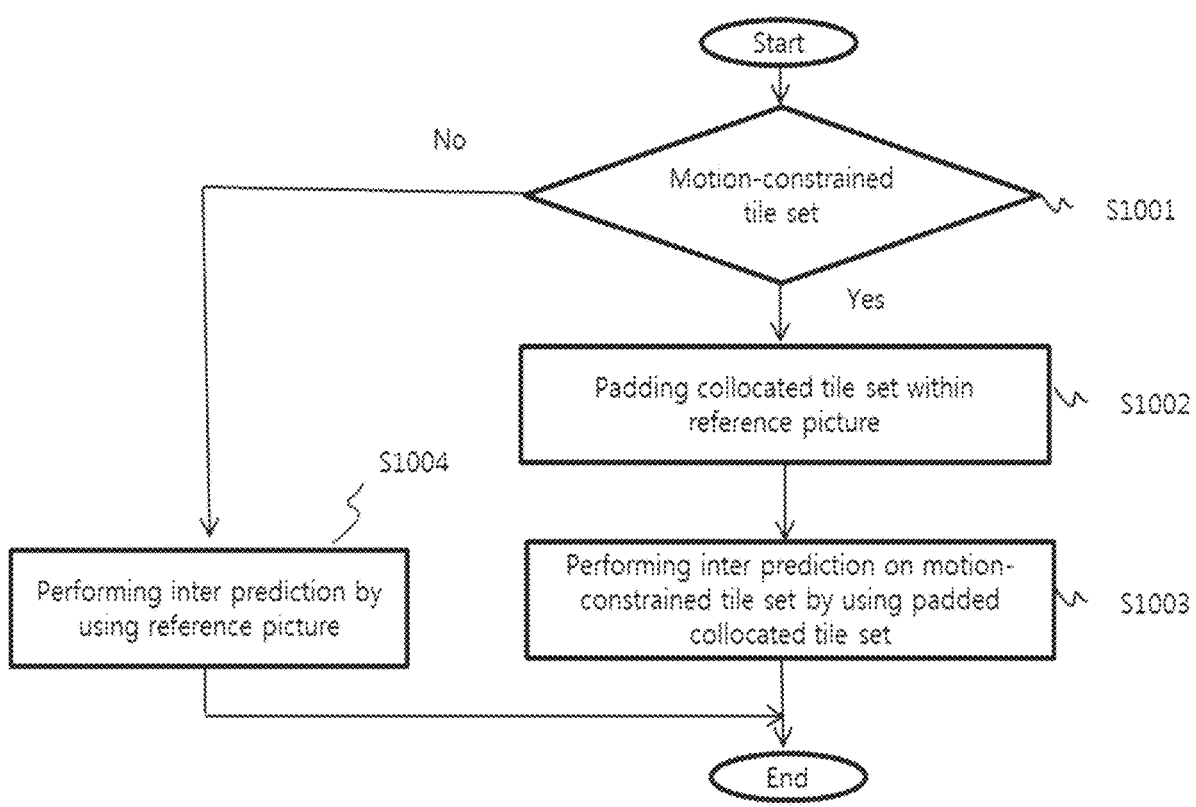
FIG. 10 is a flowchart illustrating an inter prediction method of a motion-constrained tile set according to an embodiment of the present invention.

FIG. 10 is a flowchart illustrating an inter prediction method of a motion-constrained tile set according to an embodiment of the present invention.

Referring to FIG. 10, at step S1001, whether to apply the motion-constrained tile set may be determined.

Here, the encoding apparatus 100 may determine the motion-constrained tile set according to the head tracking information or the viewport information received from the pre-processing apparatus 10 or outside.

Further, the encoding apparatus 100 may generate motion-constrained tile set information corresponding to the determined motion-constrained tile set for signaling to the decoding apparatus 200. Here, the motion-constrained tile set information may be generated in a syntax format such as an SEI message and may be included in the header of the higher level unit (a sequence, a picture, or a slice) of the tile level for signaling.

Therefore, the decoding apparatus 200 may determine, on the basis of the motion-constrained tile set information signaled from the encoding apparatus 100, whether to apply the motion-constrained tile set.

At step S1001, when determining that the motion-constrained tile set is applied (S1001—Yes), a collocated tile set within a reference picture corresponding to the motion-constrained tile set is subjected to padding at step S1002.

Padding processing on the collocated tile set will be described in detail with reference to FIG. 11.

Further, at step S1003, inter prediction may be performed on a tile set based on motion constraint by using the padded collocated tile set.

As described above, by using the padded collocated tile set, the boundary region of the collocated tile set which is not referenced in the existing motion-constrained tile set is referenced, resulting in improvement on image quality deterioration and increase in a compression ratio.

In the meantime, at step S1001, when determining that the motion-constrained tile set is not applied (S1001—Yes), inter prediction using a general reference picture is performed at step S1004.

Figure 11:
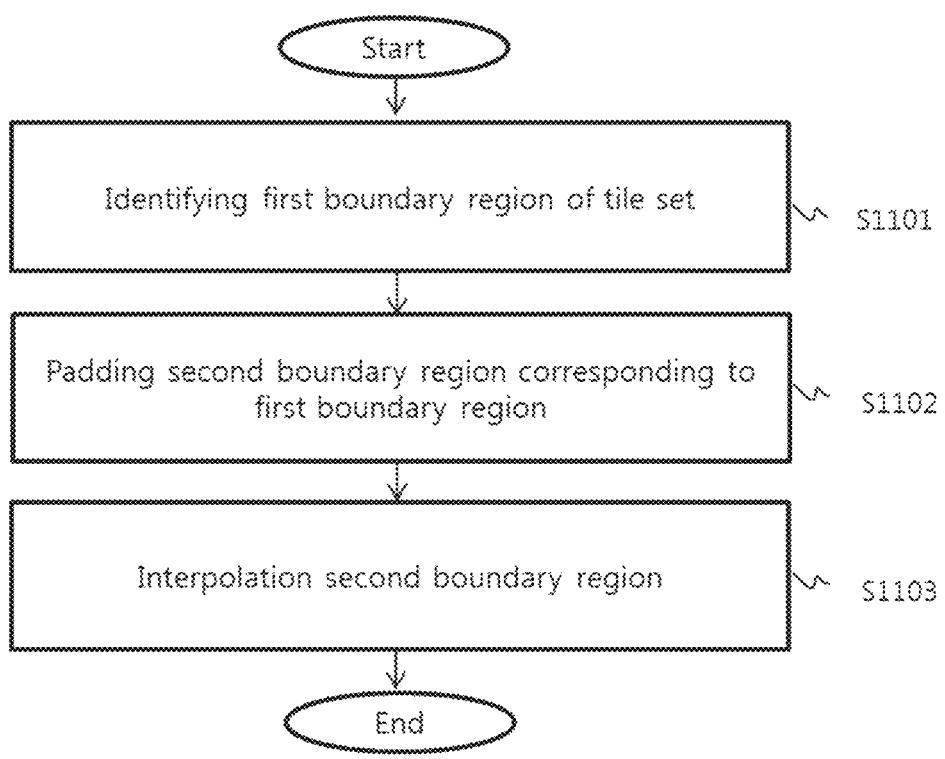
FIGS. 11 and 12 are diagrams illustrating padding processing on a collocated tile set corresponding to a motion-constrained tile set according to an embodiment of the present invention.
Figure 12:
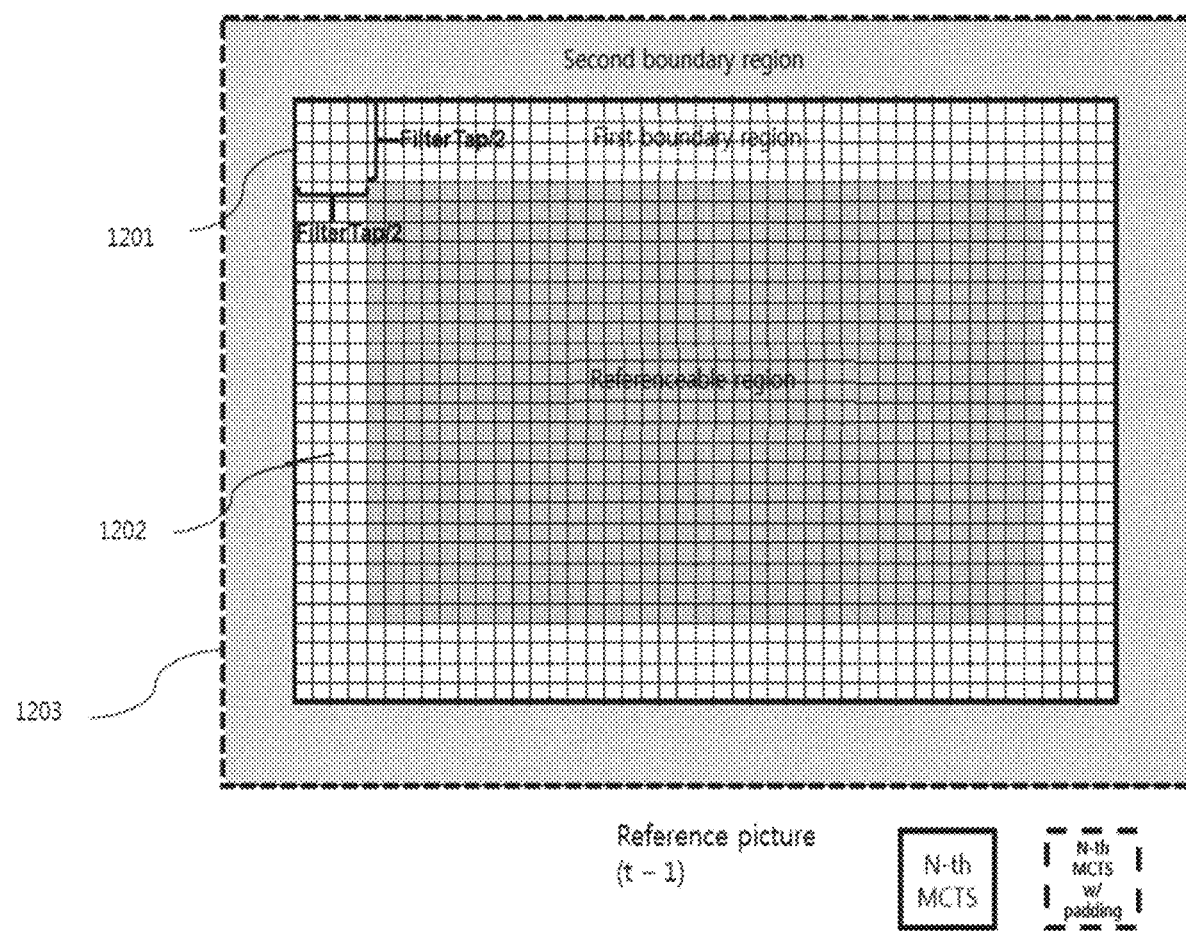

FIGS. 11 and 12 are diagrams illustrating padding processing on a collocated tile set corresponding to a motion-constrained tile set according to an embodiment of the present invention.

Referring to FIG. 11, at step S1101, a first boundary region of the collocated tile set may be identified. Here, the first boundary region may be a region formed by a predetermined number of pixels inward from the outermost boundary of the collocated tile set, or may be a region that is not referenced due to motion constraint as described in FIG. 9.

Specifically, referring to FIG. 12, the first boundary region 1202 may be defined as a region formed by a predetermined number of pixels inward from the outermost boundary 1201 according to integer precision depending on the size of the filter tap used in inter prediction.

Next, at step S1102, a second boundary region corresponding to the identified first boundary region may be subjected to padding. Here, the second boundary region 1203 may be defined as a region formed by a predetermined number of pixels outward from the outermost boundary 1201 according to integer precision depending on the size of the filter tap used in inter prediction. Alternatively, the second boundary region may be defined as a region formed by the number of pixels in the horizontal or vertical direction of the minimum size of the coding unit, or a region formed by the maximum x value or y value of the integer pixel motion vector allowed in the encoder and the decoder.

Specifically, padding processing of the second boundary region corresponding to the identified first boundary region may be performed by inserting a preset sample value (for example, zero) into the second boundary region or inserting a statistical value calculated from the nearby region of the second boundary region. Here, the statistical value calculated from the nearby region may be at least one among an average value, a weighted average value, a weighted sum value, the minimum value, the maximum value, the mode value, and the median value of the sample values of the region adjacent to the second boundary region.

Alternatively, padding may be performed using a sample value of the first boundary region adjacent to the second boundary region.

Alternatively, padding processing of the second boundary region may be performed using the pixel value within the first boundary region spatially closest to the position which is subjected to padding.

Alternatively, padding may be performing using the same method as the method defined for padding processing on the outside of the boundary of the picture.

Further, at step S1103, the padded second boundary region may be subjected to interpolation. Here, the number of taps or a coefficient of an interpolation filter used in interpolation may be determined according to the size or shape of the motion-constrained tile set.

As described above, the second boundary region subjected to padding and interpolation is used in inter prediction of the motion-constrained tile set, so that motion vectors of all the blocks included in the motion-constrained tile set are able to refer to the first boundary region 1201 as well as the second boundary region 1203.

Accordingly, the boundary region of the collocated tile set, which is not referenced in the motion-constrained tile set, is referenced, resulting in improvement on image quality deterioration and enhancement of a compression ratio.

Figure 13:
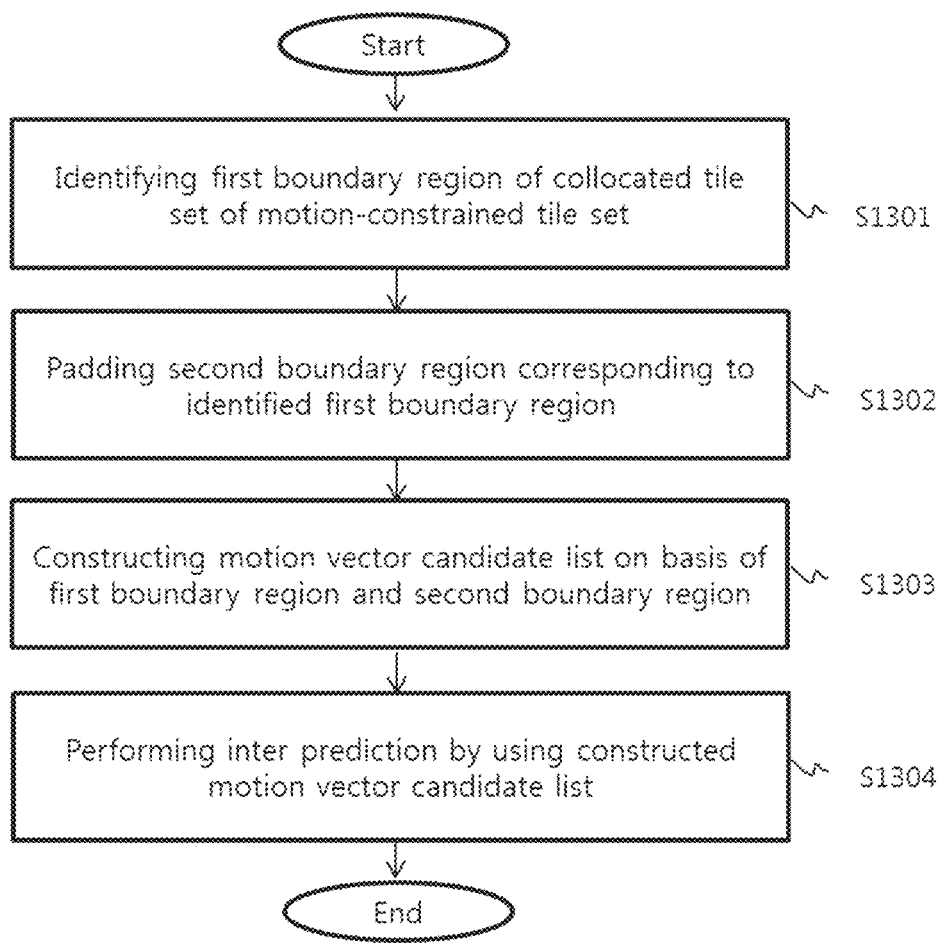
FIG. 13 is a flowchart illustrating a method of constructing a motion vector candidate list based on motion constraint according to an embodiment of the present invention.

FIG. 13 is a flowchart illustrating a method of constructing a motion vector candidate list based on motion constraint according to an embodiment of the present invention.

When the motion-constrained tile set is used, the motion vector indicating the reference sample positioned outside the collocated tile set corresponding to the motion-constrained tile set is unable to be used in inter prediction.

Therefore, when the motion-constrained tile set is used, the motion vector indicating the reference sample positioned outside the collocated tile set is unable to be used as a motion vector candidate or a merge candidate. That is, when the motion-constrained tile set is used, the motion vector indicating the reference sample positioned outside the collocated tile set is unable to be included in a motion vector candidate list or a merge candidate list.

However, when the reference sample indicated by the motion vector is the reference sample positioned outside the collocated tile set and is the reference sample positioned in the second boundary region described above, the motion vector is able to be used as the motion vector candidate or the merge candidate.

Referring to FIG. 13, a method of constructing a motion prediction candidate list based on motion constraint may include: identifying a first boundary region of a collocated tile set of a motion-constrained tile set at step S1301; padding a second boundary region corresponding to the identified first boundary region at step S1302; constructing a motion vector candidate list on the basis of the first boundary region and the second boundary region at step S1303; and performing inter prediction by using the constructed motion vector candidate list at step S1304.

The identifying of the first boundary region at step S1301 and the padding of the second boundary region at step S1302 may be performed in the same manner as steps S1101 and S1102 in FIG. 11, and a detailed description thereof will be omitted.

At the constructing of the motion vector candidate list at step S1303, the motion vector referring to the region positioned outside the second boundary region may be excluded from the motion vector candidate list.

This may be implemented in a manner that the motion vector referring to the region positioned outside the second boundary region is excluded when constructing the motion vector candidate list, or may be implemented in a manner that the motion vector candidate referring to the region positioned outside the second boundary region is excluded when selecting the optimum motion information from the motion vector candidate list.

In the meantime, at the constructing of the motion vector candidate list at step S1303, the motion vector referring to the region positioned outside the first boundary region may be excluded from the motion vector candidate list. Alternatively, assuming that the outside of the first boundary region is the same as the outside of the picture boundary, the motion vector referring to the region positioned outside the first boundary region may be excluded from the motion vector candidate list.

This may be implemented in a manner that the motion vector referring to the region positioned outside the first boundary region is excluded when constructing the motion vector candidate list, or may be implemented in a manner that the motion vector candidate referring to the region positioned outside the first boundary region is excluded when selecting the optimum motion information from the motion vector candidate list.

Further, at the constructing of the motion vector candidate list at step S1303, the motion vector that refers to at least one among the first boundary region and the second boundary region may be included in the motion vector candidate list only in the case of integer precision (inter pel).

As described above, with the construction of the motion vector candidate list based on motion constraint, it is possible to prevent the motion vector from being used in an unnecessary region when deriving the motion vector candidate or generating the motion vector candidate list.

In the meantime, the motion vector candidate and the motion vector candidate list in FIG. 13 may be replaced with the merge candidate and the merge candidate list according to the inter prediction mode for description.

Figure 14:
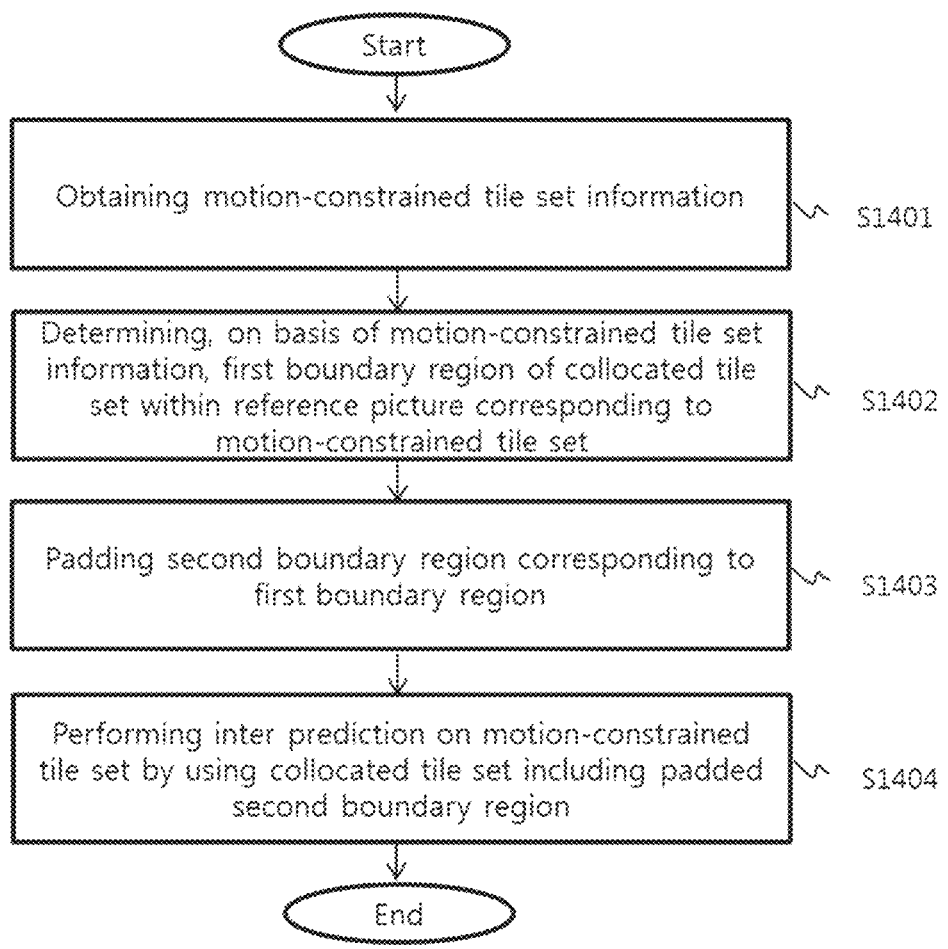
FIG. 14 is a flowchart illustrating a method of decoding an image according to an embodiment of the present invention.

FIG. 14 is a flowchart illustrating a method of decoding an image according to an embodiment of the present invention.

Referring to FIG. 14, the decoding apparatus may obtain motion-constrained tile set information from a bitstream at step S1401.

Here, the motion-constrained tile set information may be in a syntax format such as an SEI message and may be included in the header of the higher level unit (a sequence, a picture, or a slice) of the tile level for signaling.

Next, the decoding apparatus may determine, on the basis of the motion-constrained tile set information, the first boundary region of the collocated tile set within the reference picture corresponding to the motion-constrained tile set at step S1402.

Specifically, the determining of the first boundary region may include: identifying the motion-constrained tile set on the basis of the motion-constrained tile set information; and determining, as the first boundary region, the region formed by a pre-defined number of pixels inward from the outermost boundary of the collocated tile set within the reference picture corresponding the identified motion-constrained tile set.

Here, the first boundary region may be a region formed inward from the outermost boundary of the collocated tile set by the number of pixels that is determined on the basis of integer precision depending on the size of the filter tap used in inter prediction.

In the meantime, the location of the collocated tile set may be the same as the location of the motion-constrained tile set within the reference picture.

Next, the decoding apparatus may perform padding on the second boundary region corresponding to the first boundary region at step S1403.

Specifically, the padding of the second boundary region may be performed by inserting the preset sample value into the second boundary region or by inserting a value derived from the nearby region of the second boundary region into the second boundary region. Alternatively, the decoding apparatus may perform padding by using the sample value of the first boundary region adjacent to the second boundary region.

In the meantime, the padding of the second boundary region may further include interpolating the padded second boundary region.

Here, the second boundary region may be a region formed outward from the outermost boundary of the collocated tile set by the number of pixels which is determined on the basis of integer precision depending on the size of the filter tap used in inter prediction.

Next, the decoding apparatus may perform inter prediction on the motion-constrained tile set by using the collocated tile set that includes the padded second boundary region at step S1404.

Specifically, the performing of the inter prediction on the motion-constrained tile set may include: constructing the motion vector candidate list on the basis of the collocated tile set including the second boundary region; and performing inter prediction on the motion-constrained tile set by using the motion vector candidate list.

Here, at the constructing of the motion vector candidate list, the motion vector candidate list may be constructed excluding the motion vector that indicates the reference sample positioned outside the collocated tile set which includes the second boundary region, or excluding the motion vector that indicates the reference sample positioned outside the collocated tile set which includes the first boundary region.

Figure 15:
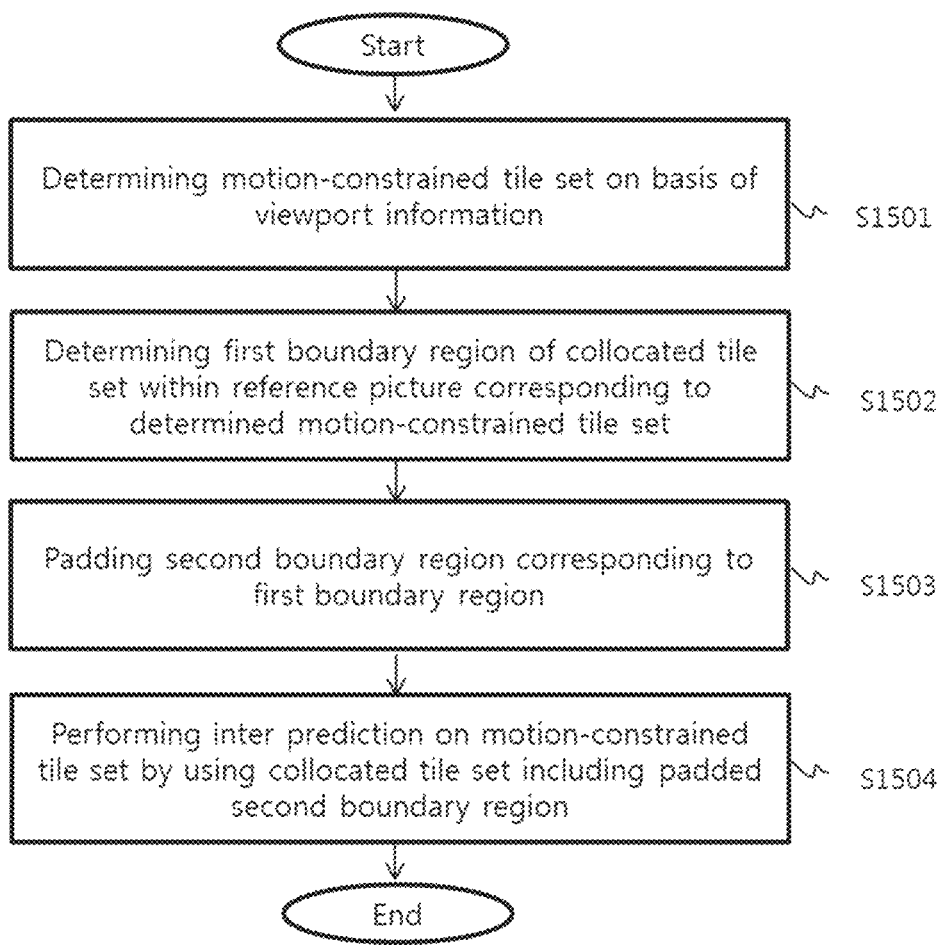
FIG. 15 is a flowchart illustrating a method of encoding an image according to an embodiment of the present invention.

FIG. 15 is a flowchart illustrating a method of encoding an image according to an embodiment of the present invention.

Referring to FIG. 15, the encoding apparatus may determine the motion-constrained tile set on the basis of the viewport information at step S1501.

Here, the viewport information may be information generated by detecting the user's eyes by the pre-processing apparatus, such as a head mount device (HMD).

Next, the encoding apparatus may determine the first boundary region of the collocated tile set within the reference picture corresponding to the determined motion-constrained tile set at step S1502.

Specifically, the first boundary region may be the region that is formed by the pre-defined number of pixels inward from the outermost boundary of the collocated tile set within the reference picture corresponding to the motion-constrained tile set which is determined at step S1501.

Further, the first boundary region may be the region formed inward from the outermost boundary of the collocated tile set by the number of pixels that is determined on the basis of integer precision depending on the size of the filter tap used in inter prediction.

In the meantime, the location of the collocated tile set may be the same as the location of the motion-constrained tile set within the reference picture.

Next, the encoding apparatus may perform padding on the second boundary region corresponding to the first boundary region at step S1503.

Specifically, the padding of the second boundary region may be performed by inserting the preset sample value into the second boundary region or by inserting a value derived from the nearby region of the second boundary region into the second boundary region. Alternatively, the decoding apparatus may perform padding by using the sample value of the first boundary region adjacent to the second boundary region.

In the meantime, the padding of the second boundary region may further include interpolating the padded second boundary region.

Here, the second boundary region may be a region formed outward from the outermost boundary of the collocated tile set by the number of pixels determined on the basis of integer precision depending on the size of the filter tap used in inter prediction.

Next, the encoding apparatus may perform inter prediction on the motion-constrained tile set by using the collocated tile set that includes the padded second boundary region at step S1504.

Specifically, the performing of the inter prediction on the motion-constrained tile set may include: constructing the motion vector candidate list on the basis of the collocated tile set including the second boundary region; and performing inter prediction on the motion-constrained tile set by using the motion vector candidate list.

Here, at the constructing of the motion vector candidate list, the motion vector candidate list may be constructed excluding the motion vector that indicates the reference sample positioned outside the collocated tile set which includes the second boundary region, or excluding the motion vector that indicates the reference sample positioned outside the collocated tile set which includes the first boundary region.

In the case of the 360 video or the virtual reality video, since the pre-processing apparatus 10 in FIG. 5 performs merging or stitching processing on images of multiple viewpoints, the image of each viewpoint may not be accurately divided in the CTU size at the right boundary or the bottom boundary of the picture or the tile. These CTUs may include images of two or more viewpoints, so that there is a problem that images of each viewpoint are not encoded and decoded into an independent tile. Therefore, a tile in flexible size may be used, which may have, for example, a multiple of the minimum size of the CU, rather than a multiple of the CTU size. In this case, the tile in flexible size may include at least one incomplete CTU on the right or bottom of the tile.

Here, the incomplete CTU may mean a CTU in a size other than the CTU size determined in a sequence or a picture. That is, the incomplete CTU may be a CTU that includes pixels of which the number is smaller or larger than the number of pixels which are included in the CTU determined in the sequence or the picture.

FIG. 16 is a diagram illustrating a tile in flexible size according to an embodiment of the present invention.

Referring to FIG. 16, one picture is divided into four tiles. A tile 1 is made up of nine CTUs, a tile 2 is made up of six CTUs, a tile 3 is made up of three CTUs, and a tile 4 is made up of two CTUs. Here, the tile 1 and the tile 2 include incomplete CTUs.

FIG. 17 is a diagram illustrating an incomplete CTU included within a tile 1 in FIG. 16.

With respect to the tile including at least incomplete CTU, the same encoding and decoding processes as one independent picture may be performed. That is, when the CTUs on the right boundary or the bottom boundary of the tile are incomplete CTUs, at least one division flag syntax element for the incomplete CTUs positioned on the boundary of the picture is not entropy encoded and decoded. Further, the encoder and the decoder may implicitly perform division in the form of a block that includes all the valid samples in the incomplete CTU.

Alternatively, only CUs including valid pixels within the CTU may be encoded and decoded.

Alternatively, in order to prevent the incomplete CTU from being generated within the tile, padding processing shown in FIGS. 11 and 12 may be used. Specifically, a block that has pixels in the complete CTU size may be generated by applying the padding processing to the incomplete CTU. Accordingly, assuming that the padding region of the incomplete CTU is a valid pixel region, encoding and decoding processes may be performed. Here, the complete CTU may be a CTU in the CTU size determined in a sequence or a picture.

FIG. 18 is a diagram illustrating padding processing on an incomplete CTU according to an embodiment of the present invention.

The padding processing of the incomplete CTU may be the same as the padding processing shown in FIGS. 11 and 12. Thus, the horizontal or vertical size of the tile may be represented by a multiple of the CTU size.

In the meantime, the size of the padding region may be signaled via a header of one among the tile, the tile set, the slice, and the picture.

Alternatively, information indicating the number of pixels in the horizontal or vertical direction in the padding region may be signaled via a header of one among the tile, the tile set, the slice, and the picture.

Alternatively, the horizontal or vertical size of the tile may be represented by, rather than a multiple of the CTU, a multiple of two or a multiple of the minimum size of the CU, meaning a size that is stored in a DPB or is displayed, and may be signaled via a header of one among the tile, the tile set, the slice, and the picture. As described above, when the horizontal or vertical size of the tile is represented by, rather than the multiple of the CTU, the multiple of two or the multiple of the minimum size of the CU, meaning the size that is stored in the DPB or is displayed, the horizontal or vertical size of the padding region may be implicitly found out by the decoder without transmission.

Alternatively, in order to prevent generation of at least one incomplete CTU that may be present on the right boundary or bottom boundary of the tile, the tile may use pixels of spatially adjacent other tiles. Specifically, pixels of other tiles spatially adjacent to the incomplete CTU may be used to generate a block that has pixels in the complete CTU size. Accordingly, assuming that the extended region of the incomplete CTU is a valid pixel region, encoding and decoding processes may be performed.

FIG. 19 is a diagram illustrating a process of generating a complete CTU by using a sample of a tile spatially adjacent to an incomplete CTU according to an embodiment of the present invention. The extended region in FIG. 19 may be a region extended using a sample of a spatially adjacent tile intactly.

In the case of the 360 video, when performing encoding and decoding with an independent tile on each of the sub images, either the padding method in FIG. 18 or the method of using a pixel of a spatially adjacent tile in FIG. 19 is selected and the incomplete CTU is changed into the complete CTU. Here, the selection of either the padding method in FIG. 18 or the method of using the pixel of the spatially adjacent tile in FIG. 19 may be determined on the basis of at least one among the projection transform method of the 360 video and spatial continuity of sub images that may be derived by the spatial layout information.

Alternatively, the encoder selectively uses the most efficient method among the two methods described above, and signals syntax element information indicating which method is used via a header of one among the tile, the tile set, the slice, and the picture in such a manner as to enable the decoder to perform decoding using the same method.

In the meantime, in performing deblock filtering on the tile boundary, when using the above-described methods for preventing the incomplete CTUs that may be present on the right boundary or the bottom boundary of the tile from being generated, the reconstructed pixels positioned in the padding region in FIG. 18 or the extended region in FIG. 19 is not used in deblock filtering process of the nearby pixels or is not subjected to deblock filtering, regardless of whether deblock filtering is performed on the tile boundary.

Assuming that the reconstructed pixels of other tiles adjacent to the valid region of the tile wherein the padding region of FIG. 18 or the extended region of FIG. 19 are cropped are present in continuous spaces, deblock filtering may be performed on the tile boundary.

That is, as shown in FIG. 18, even though padding processing is performed on the tile 1 and encoding and decoding are performed in the form of the complete CTU, deblock filtering is performed on only the valid region by using the pixel of the tile 2 nearby as shown in FIG. 16. Thus, it is possible to effectively remove blocking artifacts that may be present on the boundary between adjacent tiles.

In the meantime, in the process of storing the reconstructed tile in the DPB or displaying the same, when using the above-described methods for preventing the incomplete CTUs that may be present on the right boundary or the bottom boundary of the tile from being generated, only the reconstructed pixels of the valid region wherein the padding regions in FIG. 18 or the extended regions in FIG. 19 are cropped are stored in the DPB or displayed.

Here, when performing deblock filtering on the tile boundaries with respect to the current tile or all the tiles within the current picture, a deblock filtering method may be performed on the reconstructed pixels of other tiles adjacent to the valid region wherein the padding region or the extended region is cropped as described above, and the deblock filtering pixel may be stored in the DPB or displayed.

In the meantime, in the process of predicting temporal motion information or generating the merge candidate list, when using the above-described methods for preventing the incomplete CTUs that may be present on the right boundary or the bottom boundary of the tile from being generated, motion vector (MV) information of the CUs included in the padding region of FIG. 18 or the extended region of FIG. 19 is not used in predicting temporal motion information of the CUs of the picture to be encoded or decoded in the future or in generating the merge candidate list, or is not stored in a temporal motion information buffer.

A real-time encoder and decoder have a limited size of an image to be encoded and decoded at a predetermined unit time. Therefore, in order to encode and decode one picture with screen resolution of 4K or more, such as 360 video images, multiple encoders and decoders divide one picture into one or more tiles, tile sets, or tile groups and perform encoding and decoding in parallel, thereby facilitating real-time encoding and decoding. However, when the horizontal length of the time is considerably long, a size of a line buffer of the encoder and the decoder also increases in proportion to the horizontal length, resulting in a large increase in implementation cost of the encoder and the decoder.

Therefore, when the maximum horizontal length of the tile is limited to a predetermined size or less that is defined by the encoder and the decoder, the increase in the implementation cost of the encoder and the decoder is limited.

For example, even though the screen resolution supported by the encoder or the decoder is a maximum of 8K×4K, when the horizontal length of screen resolution to be encoded and decoded exceeds 4K, division into at least two tiles in the vertical direction takes place to limit the horizontal length of each tile to 4K or less.

The definition of this constraint may be provided according to the level. For example, an encoder and a decoder supporting a relatively low level, such as a maximum screen resolution of 2K×1K, limit the maximum horizontal size supported by one encoder or decoder and the maximum horizontal size of the tile to 1K and perform encoding and decoding with division into at least two tiles in the vertical direction.

On the other hand, an encoder and a decoder supporting a relatively high level, such as a maximum screen resolution of 8K×4K, limit the maximum horizontal size supported by one encoder or decoder and the maximum horizontal size of the tile to 4K and perform encoding and decoding with division into at least two tiles in the vertical direction.

Alternatively, in the case of the 360 video, by using the projection transform method and size information of sub images for each viewpoint derived by the spatial layout information, each sub image may be encoded and decoded as an independent tile according to each size.

Therefore, a 360 video with screen resolution of 4K or more is able to use at least two tiles, thereby limiting an increase in the implementation cost.

The method of encoding an image according to the embodiment of the present invention has been described above. The bitstream generated using the above-described method of encoding the image may be stored in a computer-readable non-transitory recording medium.

The above embodiments may be performed in the same method in an encoder and a decoder.

An image may be encoded/decoded by using at least one or a combination of at least one among the above embodiments.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or the corresponding tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. A method of decoding an image, the method comprising:
    obtaining motion-constrained region information;
    deriving motion information; and
    performing inter prediction based on the motion-constrained region information and the motion information,
    when the motion-constrained region information indicates that motion-constrained region is applied, a configuration of motion-constrained region of a reference picture used for inter prediction is equal to a configuration of motion-constrained region of a current picture,
    when a reference sample value outside the motion-constrained region of the reference picture is required for the inter prediction, wherein the inter prediction is performed by using a sample value of a boundary of the motion-constrained region of the reference picture instead of the reference sample value outside the motion-constrained region of the reference picture, and
    wherein the motion-constrained region information is signaled in units of a sequence.

2. A method of encoding an image, the method comprising:
    determining motion-constrained region information;
    determining motion information; and
    performing inter prediction based on the motion-constrained region information and the motion information,
    when the motion-constrained region information indicates that motion-constrained region is applied, a configuration of motion-constrained region of a reference picture used for inter prediction is equal to a configuration of motion-constrained region of a current picture,
    when a reference sample value outside the motion-constrained region of the reference picture is required for the inter prediction, wherein the inter prediction is performed by using a sample value of a boundary of the motion-constrained region of the reference picture instead of the reference sample value outside the motion-constrained region of the reference picture, and
    wherein the motion-constrained region information is signaled in units of a sequence.

3. A computer-readable non-transitory recording medium storing a bitstream formed by a method of encoding an image, the method comprising:
    determining motion-constrained region information;
    determining motion information; and
    performing inter prediction based on the motion-constrained region information and the motion information,
    when the motion-constrained region information indicates that motion-constrained region is applied, a configuration of motion-constrained region of a reference picture used for inter prediction is equal to a configuration of motion-constrained region of a current picture,
    when a reference sample value outside the motion-constrained region of the reference picture is required for the inter prediction, wherein the inter prediction is performed by using a sample value of a boundary of the motion-constrained region of the reference picture instead of the reference sample value outside the motion-constrained region of the reference picture, and wherein the motion-constrained region information is signaled in units of a sequence.

* * * * *